United States Patent [19]

Murata et al.

[11] 4,104,698

[45] Aug. 1, 1978

[54] WAX COMPOSITIONS FOR FLAME RETARDANT ELECTRICAL INSULATION COATINGS

[75] Inventors: Takao Murata; Nobutaka Nakamura; Tateo Goto, all of Fujieda, Japan

[73] Assignee: Sumitomo Durez Company, Ltd., Tokyo, Japan

[21] Appl. No.: 766,413

[22] Filed: Feb. 7, 1977

Related U.S. Application Data

[60] Division of Ser. No. 621,458, Oct. 10, 1975, Pat. No. 4,032,490, which is a continuation-in-part of Ser. No. 524,304, Nov. 15, 1974, abandoned.

[30] Foreign Application Priority Data

Nov. 15, 1973 [JP] Japan ................................. 48-127721

[51] Int. Cl.$^2$ ............................................. H01G 4/12
[52] U.S. Cl. .................................. 361/321; 260/23.3; 260/28 R; 260/28 P; 260/28.5 A; 260/28.5 B; 260/45.95 G
[58] Field of Search ............ 361/321; 260/23.3, 28 R, 260/28 P, 28.5 A, 28.5 B, 45.95 G

[56] References Cited

U.S. PATENT DOCUMENTS

| | | | |
|---|---|---|---|
| 2,462,803 | 2/1949 | Campbell et al. | 260/28 |
| 3,331,797 | 7/1967 | Kopetz et al. | 260/45.7 R |
| 3,728,304 | 4/1973 | Hirao et al. | 260/45.95 G |
| 4,032,490 | 6/1977 | Murata et al. | 260/28 P |

*Primary Examiner*—Melvyn I. Marquis
*Attorney, Agent, or Firm*—Peter F. Casella; James F. Mudd; William G. Gosz

[57] ABSTRACT

A ceramic capacitor is provided having a flame retardant electrical insulation coating characterized by blending 10 – 15 percent by weight of an uniformly melt-blendable non-heat-reactive type synthetic resin, with melting points between 70° and 150° C. into a flame-retardant wax, which contains a halogenated flame retardent.

6 Claims, No Drawings

WAX COMPOSITIONS FOR FLAME RETARDANT ELECTRICAL INSULATION COATINGS

CROSS REFERENCE TO RELATED APPLICATION

This is a division, of application Ser. No. 621,458, filed Oct. 10, 1975, now U.S. Pat. No. 4,032,490 which is a continuation-in-part of Ser. No. 524,304 filed Nov. 15, 1974, now abandoned.

BACKGROUND OF THE INVENTION

The present invention relates to flame retardant blended wax compositions which have excellent electric insulating properties and good workability for impregnation and coating, characterized by first blending the flame retardant with petroleum wax, and then adding non-heat-reactive type synthetic resins.

The performance characteristics required for waxes used for insulation of electrical and electronic parts include not only essentially excellent electric insulation characteristics, but also good impregnation and coating properties. Moreover, such waxes desirably should have high melting and softening points, and also be translucent with a low volume shrinkage ratio on solidification. Therefore generally microcrystalline waxes derived from petroleum are used. But, in recent years there has been a surge in requirement for flame retardancy for non-textile materials used as electrical insulation materials in the electric and electronic field, therefore, waxes used for electrical insulation must be also flame retardant, not to mention the various properties required of them as cited above. It is already widely known that flame retardancy of microcrystalline wax can at least be attained by blending some flame retarder, and this property can be enhanced by increasing the blending ratio of the flame retarder to the base wax, but on the other hand, in such a case, electric insulation and impregnating and coating properties generally deteriorate, and a decrease in melting point also occurs.

SUMMARY OF THE INVENTION

It has been found that not only the above-mentioned defects of ordinarily blended flame retardant waxes can be prevented, but also that shrinkage in volume of such waxes upon solidification can be decreased by blending non-heat-reactive type synthetic resins which are compatible with the flame-retardant-blended wax compositions. By non-heat-reactive resin is meant a permanently fusible resin, i.e., a thermoplastic resin, such as the uncured novolac resins described in D. F. Gould "Phenolic Resins", Rheinhold Publishing Corporation, 1959, page 31, line 9 to page 32, line 2.

DESCRIPTION OF THE DETAILED EMBODIMENTS

For electrical insulation generally, petroleum derived waxes such as paraffin wax, microcrystalline wax and the like, or blended waxes which contain such petroleum waxes as the main component, and to which polyethylene, polypropylene and so forth are added are in use. However, the suitable waxes used in the present invention are selected from among microcrystalline waxes, which combine excellent properties such as electric insulation, workability for impregnation and coating, etc.

As for flame retardants in general, there are so-called "halogenated flame retardants" which contain chlorine or bromine, phosphorus compounds, ammonium phosphate compounds, antimony oxide, boric acid, etc., but the suitable flame retardants used in the present invention are generally selected from the halogenated flame retardants which have good compatibility with microcrystalline waxes mentioned before, the melting points of the retardants being between 70° and 150° C., with decomposition temperatures higher than 200° C. Such compounds containing more than 50 percent by weight of halogen are suitable for practical usage. And especially in order to maintain the electrical insulation high, bromine compounds are the most suitable among such halogenated compounds. Accordingly, "Pyroguard SR-100," a proprietary alkoxy tribromobenzene, i.e., an alkyl ether of a tribromophenol, manufactured by Daiichi Kogyo Seiyaku Co., Ltd., is preferably used. The proportion of flame retardant blended into the wax according to the present invention will vary with the degree of flame retardancy desired. Although it is possible to use blends containing the flame retardant in the wax in a range of 10 to 200 percent by weight based on the weight of the wax, in practical use good results are obtained by incorporating the flame retardant in a proportion of 80 and 120 percent by weight based on the weight of the wax.

Among the following non-heat-reactive type synthetic resins used in the present invention, viz. novolacs derived from phenol and/or alkyl-phenols, petroleum-derived resins, alkyl-benzene resins, terpene resins, cumarone resins, guanamine resins, alicyclic saturated hydrocarbon resins and the like, those compatible with waxes having melting points between 70° and 150° C. are preferred. If a resin which has a melting point lower than 70° C. is used, the non-heat-reactive type synthetic resin becomes soft within the wax-blended state with the rise in ambient operating temperature of the insulated electrical or electronic parts, and the coatings are markedly deformed even by a very slight stress applied to it, and finally, the coating will flow away. In case of using such non-heat-reactive type synthetic resins which have melting points higher than 150° C., the coatings become brittle in low ambient temperature and are apt to crack or peel. Moreover, when the blending proportion of non-heat-reactive type synthetic resins mentioned above to such waxes is less than 10 percent by weight, the blending effect of those synthetic resins is hardly recognizable, and on the other hand, when the blend proportion exceeds 50 percent by weight, there is fear of degrading the flame retardancy. Therefore, it is preferable to maintain the blending proportion of non-heat-reactive type synthetic resins to wax components within the range of 10 to 50 percent by weight.

Examples of phenols which can be used alone or in preparing phenol-aldehyde condensates or other phenolic resins such as terpene modified phenolic resins, for use in practicing the invention include phenol itself or substituted phenols having the following general formula:

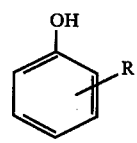

where R may be H, F, Cl, Br, or a suitable substitutent selected from the following:

(a) Alkyl groups of one to eighteen carbon atoms in any of their isomeric forms and substituted on the phenolic nucleus in the ortho, meta or para positions;
(b) Alicyclic groups of five to eighteen carbons atoms such as cyclohexyl, cyclopentyl, methyl cyclohexyl, butylcyclohexyl, etc.;
(c) Aromatic or aralkyl groups of six to eighteen carbon atoms such as phenyl, alpha-methyl bnezyl, benzyl, cumyl, etc.;
(d) Alkyl, alicyclic, aryl and aralkyl ketones wherein the hydrocarbon is defined hereinbefore;
(e) Alkyl, alicyclic, aryl and aralkyl carboxylic groups wherein the hydrocarbon is defined hereinbefore.

Suitable substituted phenols include the following: para-tertiary-butylphenol, para-secondary-butylphenol, para-tertiary-amylphenol, para-secondary-amylphenol, para-tertiary-hexylphenol, para-isooctylphenol, para-phenylphenol, para-benzylphenol, para-cyclohexylphenol, para-decylphenol, para-dodecylphenol, para-tetra-decylphenol, para-betanaphthylphenol, para-alphanaphthylphenol, para-pentadecylphenol, para-cetylphenol, para-cumylphenol, para-hydroxy acetophenone, para-hydroxy benzophenone, a phenol alkylated with limonene, a phenol alkylated with oleic acid, as well as the corresponding ortho and meta derivatives such as meta-butylphenol and ortho-butylphenol; as well as mixtures thereof.

From the foregoing, it is apparent that substantially any phenol can be used in practicing the present invention provided it has a reactive hydroxyl group and is capable of reacting with aldehydes such as formaldehyde to produce a condensate. The pure refined phenols may be used, but this is not always necessary. For instance, phenols may be nuclearly alkylated and then reacted with an aldehyde, the crude product containing some polyalkylated as well as unalkylated phenols. Mixtures of phenols mentioned herein also may be used.

In producing the phenol-aldehyde condensates, any suitable aldehyde or mixtures of aldehydes capable of reacting with a phenol and having not more than, for example, eight carbon atoms is satisfactory provided it does not contain a functional group or structure which is detrimental to the resinification reaction. The preferred aldehyde is formaldehyde, which may be in aqueous solution or in any of its low polymeric forms such as paraform or trioxane. Other examples of aldehyde include acetaldehyde, propionaldehyde, butraldehyde, benzaldehyde, furfural, 2-ethylhexanal, ethylbutraldehyde, heptaldehyde, glyoxal and the like.

The two-step or novolac resins are prepared by methods commonly known in the art, such as by reacting the phenol and the aldehyde in the presence of an acid catalyst such as sulfuric, hydrochloric or oxalic acid. Basic catalysts such as ammonia or amines can also be employed when alkaline conditions are used to prepare the novolac according to the procedure of D. F. Gould op. cit., page 33, lines 1-4. Generally about 0.5 to 0.9 moles of aldehyde are used per mole of phenol. The phenol aldehyde resins can be modified with rosin or lignin by methods known in the art to provide resins that can be suitably processed in accordance with the invention.

The main object of the present invention is to prevent the adverse effects caused by the addition of flame retardants to waxes, such as a decrease in the insulation property by the presence of flame retardants, an increase in melt viscosity, and a lowering of melting and/or softening points. Moreover, the resin additive has beneficial effects in lowering the melt viscosity, thereby facilitating the workability of impregnation in vacuum, decreasing the volume shrinkage when solidified, raising the melting point and/or softening point and the like, all of which contribute to improving the electric insulation and especially the moisture resistance of the wax coatings.

The following examples are shown so as to explain in detail the present invention, but the present invention is not restricted by them. "Part" and "%" described herein refer to parts and percentages by weight respectively unless otherwise specified.

EXAMPLE 1

To a flame retardant wax, a blend of 100 parts of "Pyroguard SR-100" (Daiichi Kogyo Seiyaku Co., Ltd.)* and 100 parts of "Micro Wax 190Y" (Mobile Petroleum Co., Ltd.) was added 20 parts of "Durez 12603 Resin" (Hooker Chemicals & Plastics Corp., U.S.A.), a non-heat-reactive type terpene modified phenolic resin having a molecular weight of 900 – 950 and a melting point of 130° – 136° C., and mixed uniformly by heat melting for 30 minutes at 140° C. The test methods for measuring the physical properties carried out on the blended flame retardant wax obtained were as follows:

(a) Melting Point:
Observing the temperature when the opaque blended wax becomes transparent when heated in a test tube, 5 mm. in diameter.
(b) Melt-viscosity:
The blended wax is melted at 100° C., 125° C., or 150° C., and then the melt viscosities at respective temperatures were measured by using a Brookfield rotation type viscometer.
(c) Solidification volume shrinkage:
The volume decrease which occurs when the molten blended wax at 130° C solidifies to room temperature expressed in percentage of the molten wax.
(d) Moisture resistance:
A ceramic capacitor of 70 pF was first coated with a primer phenolic resin insulation varnish and then was impregnated and coated with blended wax 10 minutes under vacuum at 140° C. The coated ceramic capacitor was conditioned 48 hours in an atmosphere of 85° C and 95% relative humidity, thereafter its resistance (IR-value: resistance of capacitor) and Q-value measured. The deterioration which occurred by such conditioning was observed.
(e) Flame retardancy:
A ceramic capacitor which diameter was 15 mm was first coated with a phenolic varnish primer and then impregnated under vacuum with blended wax by the same method described above in the test of moisture resistance. This was used as a test specimen for observing the burning quality specified by the UL-Standards (UL-492).

*A proprietary alkyl ether of tribromophenol having a melting point of at least 78° C., a decomposition temperature of at least 280° C., a halogen content of at least 70%, the ether being non-soluble in water and n-hexane, difficultly soluble in alcohol, acetone and carbon tetrachloride, and soluble in in benzene, i.e., soluble in excess of 50% in benzene as described in the bulletin entitled "Flame Retardants for Plastics, Pyroguard" published by Daiichi Kogyo Seiyaku Co., Ltd.

The test results are shown in Table 1. Results of a similar test run on a blended flame retardant wax prepared without the addition of non-heat-reactive type synthetic resin are also shown in Table 1 under the designation "Comparative Example 1."

TABLE 1

|  | Units or testing Conditions | Example 1 | Comparative Example 1 |
|---|---|---|---|
| Blended Wax Compositions: |  |  |  |
| Wax | gr | 100 | 100 |
| Flame Retardant | gr | 100 | 100 |
| Non-heat-reactive type modified phenolic resin | gr | 20 | — |
| Physical Properties of Blended Waxes: |  |  |  |
| Melting point | ° C | 94 | 86 |
| Melt viscosity | Poises at 100° C | 0.17 | 0.30 |
|  | Poises at 125° C | 0.09 | 0.14 |
|  | Poised at 150° C | 0.05 | 0.09 |
| Solidification volume shrinkage | % | 9 | 15 |
| Moisture Resistance of Ceramic Capacitors: |  |  |  |
| Q-value:- |  |  |  |
| Initial (before conditioning) |  | 2,100 | 2,100 |
| After conditioning |  | 1,100 | 600 |
| *IR-value:- |  |  |  |
| Initial (before conditioning) | M | $8 \times 10^4$ | $8 \times 10^4$ |
| After conditioning | M | $2 \times 10^4$ | $7 \times 10^2$ |
| Flame Retardancy of Ceramic Capacitor: | UL-492 | SE-0 | SE-0 |

*Resistance of capacitor.

From Table 1, the improvement made by this invention of adding a non-heat-reactive type phenolic resin to a flame retardant wax is clearly shown by the data of moisture resistance of the ceramic capacitor, and the decrease in melt viscosity and in solidification volume shrinkage, so impregnation under vacuum and coating is better and cracking at low temperature is definitely reduced. Notwithstanding the addition of resins to the wax, flame retardancy remains intact.

EXAMPLES 2 – 5

To a flame retardant wax, a blend of 80 parts of a flame retardant "Pyroguard SR-100" (Daiichi Kogyo Seiyaku Co., Ltd.) and 100 parts of "Microwax 190A" (Chukyo Oils and Fats Co., Ltd.) was added and blended respectively 10 parts, 20 parts, 50 parts or 70 parts of a non-heat-reactive para-tertiary octyl phenol-formaldehyde novolac resin having a melting point of 90° C.

They were mixed uniformly by heat-melting 30 minutes at 140° C. The test results of those waxes are shown in Table 2. The flame retardant blended waxes are quoted respectively as "Example 2, 3, 4 and 5," and such waxes without the addition of a novolac resin are also shown in Table 2 under the designation "Comparative Example 2."

TABLE 2

|  | Units or Testing Conditions | Comparative Example 2 | Example 2 | Example 3 | Example 4 | Example 5 |
|---|---|---|---|---|---|---|
| Blended Wax Compositions: |  |  |  |  |  |  |
| Wax | gr | 100 | 100 | 100 | 100 | 100 |
| Flame Retardant | gr | 80 | 80 | 80 | 80 | 80 |
| Non-heat-reactive type modified phenolic resin | gr | — | 10 | 20 | 50 | 70 |
| Physical Properties of Blended Waxes: |  |  |  |  |  |  |
| Melting point | ° C | 88 | 92 | 95 | 96 | 98 |
| Melt viscosity | Poises at 100° C | 0.29 | 0.21 | 0.16 | 0.31 | 0.86 |
|  | Poises at 125° C | 0.13 | 0.10 | 0.08 | 0.15 | 0.43 |
|  | Poises at 150° C | 0.09 | 0.07 | 0.05 | 0.10 | 0.33 |
| Solidification volume shrinkage | % | 14 | 11 | 9 | 4 | 3 |
| Moisture Resistance of Ceramic Capacitor: |  |  |  |  |  |  |
| Q-value: |  |  |  |  |  |  |
| Initial (before moisture treatment) |  | 2,200 | 2,200 | 2,200 | 2,200 | 2,200 |
| After moisture treatment |  | 700 | 1,300 | 1,400 | 1,300 | 1,000 |
| *IR-value:- |  |  |  |  |  |  |
| Initial (before moisture treatment) | M | $8 \times 10^4$ | $8 \times 10^4$ | $8 \times 10^4$ | $8 \times 10^4$ | $8 \times 10^4$ |
| After moisture treatment | M | $9 \times 10^2$ | $1 \times 10^4$ | $3 \times 10^4$ | $9 \times 10^3$ | $4 \times 10^3$ |
| Flame Retardancy of Ceramic Capacitor: | UL-492 | SE-0 | Se-0 | SE-0 | SE-0 | SE-0 |

*Resistance of capacitor.

It is clear from Table 2 that the addition and blending of non-heat-reactive type modified phenolic resin raises the melting points of such blended waxes, the rise becoming higher with the increase in the amount of resin; on the contrary, solidification volume shrinkage decreases with the increase in resin addition. But the best blend for a coating for ceramic capacitors with appropriate melt viscosity and good moisture resistance is the addition of 20 parts to 50 parts of non-heat-reactive type modified phenolic resins to 100 parts of wax, and for practical uses 10 parts to 50 parts of resin added to 100 parts of waxes is the most suitable range. In Example 5, it is evident that the flame retardancy of the ceramic capacitor deteriorates, and the melt viscosity of the blended wax becmes too high, when the resin exceeds the range cited here.

Various modifications and variations of the invention can be made so that the foregoing specific embodiments are to be taken as illustrative and not to limit the invention.

We claim:

1. A ceramic capacitor containing as a coating an electrical insulating composition comprising a microcrystalline wax, a halogenated organic flame retardant, and a synthetic resin, the improvement wherein the insulating composition contains as a flame retardant tribromophenol alkyl ether which has a decomposition temperature above about 200° C and which has a melting point of about 70° C to about 150° C in a proportion of about 10 to about 200 percent by weight of the wax and as the synthetic resin a thermoplastic resin selected from the group consisting of phenolic resins, alkylphenolic resins, alkyl-benzene resins, terpene resins, cumarone resins, quanamine resins, and alicyclic saturated hydrocarbon resins, said thermoplastic resin having a melting point of about 70° C to about 150° C and is present in a proportion of about 10 to about 50 percent by weight of said wax.

2. The capacitor of claim 1 wherein the proportion of the flame retardant is about 80 to about 120 percent by weight of the wax.

3. The capacitor of claim 2 wherein said thermoplastic synthetic resin is a terpene-modified phenolic resin.

4. The capacitor of claim 2 wherein said thermoplastic synthetic resin is a novolac resin.

5. The capacitor of claim 4 wherein said novolac resin is a para-tertiary octyl phenol-formaldehyde novolac resin.

6. The capacitor of claim 5 wherein the flame retardant has a melting point of at least 78° C., a decomposition temperature of at least 280° C., and is insoluble in water and n-hexane, difficulty soluble in alcohol, acetone and carbon tetrachloride and soluble in benzene.

* * * * *